United States Patent
Wray

(10) Patent No.: US 7,237,107 B2
(45) Date of Patent: Jun. 26, 2007

(54) METHOD AND APPARATUS FOR DISCOVERING A TRUST CHAIN IMPARTING A REQUIRED ATTRIBUTE TO A SUBJECT

(75) Inventor: Michael Wray, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1410 days.

(21) Appl. No.: 09/732,954

(22) Filed: Dec. 7, 2000

(65) Prior Publication Data

US 2001/0014943 A1 Aug. 16, 2001

(30) Foreign Application Priority Data

Dec. 8, 1999 (GB) .................................. 9929033.0

(51) Int. Cl.
*H04L 29/00* (2006.01)

(52) U.S. Cl. ..................................................... 713/157

(58) Field of Classification Search ................ 713/157, 713/175, 176; 707/9
See application file for complete search history.

(56) References Cited

U.S. PATENT DOCUMENTS

| | | | |
|---|---|---|---|
| 4,868,877 A * | 9/1989 | Fischer | 713/157 |
| 5,005,200 A * | 4/1991 | Fischer | 380/30 |
| 5,218,637 A | 6/1993 | Angebaud et al. | |
| 5,300,795 A | 4/1994 | Saunier et al. | 257/192 |
| 5,497,422 A | 3/1996 | Tysen et al. | |
| 5,515,441 A | 5/1996 | Faucher | |
| 5,819,044 A | 10/1998 | Kawabe et al. | 395/200.56 |
| 5,825,890 A | 10/1998 | Elgamal et al. | 713/151 |
| 5,898,784 A | 4/1999 | Kirby et al. | 713/513 |
| 5,907,621 A | 5/1999 | Bachman et al. | |
| 5,923,842 A | 7/1999 | Pedersen et al. | 395/188.01 |
| 5,940,591 A | 8/1999 | Boyle et al. | 713/201 |

(Continued)

FOREIGN PATENT DOCUMENTS

EP 0 328 232 A2 8/1989

(Continued)

OTHER PUBLICATIONS

The Book of Applied Cryptography, Menezes et al, CRC Press, 1997.*

(Continued)

*Primary Examiner*—Kambiz Zand
*Assistant Examiner*—Andrew L Nalven

(57) ABSTRACT

A method is disclosed for discovering a trust chain that imparts a required attribute to a subject and is grounded in a trusted principal that is the issuer of a known trusted attribute delegation. The method involves setting as a primary goal to be proved an attribute delegation from a trusted principal to the subject and then seeking a backwards proof of the primary goal by a process of recursively taking a goal to be proved, starting with the primary goal, and decomposing it into subgoals one of which corresponds to an attribute delegation already proved by an available certificate. If it is not possible to decompose a subgoal that has not been proved, the process backtracks to a previous subgoal to seek a new decomposition of the latter. A trust chain is taken as found when the process produces a chain of subgoals proved by corresponding certificates, that grounds in a subgoal proved by a trusted attribute delegation. Name mappings are also permitted.

36 Claims, 8 Drawing Sheets

U.S. PATENT DOCUMENTS

| | | | |
|---|---|---|---|
| 5,958,050 | A | 9/1999 | Griffin et al. |
| 6,035,402 | A | 3/2000 | Vaeth et al. ............... 726/2 |
| 6,081,900 | A | 6/2000 | Subramanian et al. ...... 713/201 |
| 6,094,437 | A | 7/2000 | Loehndorf et al. ......... 370/420 |
| 6,094,485 | A | 7/2000 | Weinstein et al. ............ 380/30 |
| 6,134,550 | A * | 10/2000 | Van Oorschot et al. ......... 707/9 |
| 6,135,646 | A | 10/2000 | Kahn et al. ................ 709/217 |
| 6,263,318 | B1 | 7/2001 | Kimura et al. ............... 705/27 |
| 6,292,839 | B1 | 9/2001 | Naudus et al. ............. 709/238 |
| 6,377,691 | B1 | 4/2002 | Swift et al. ................ 380/277 |
| 6,574,224 | B1 | 6/2003 | Brueckheimer et al. . 370/395.6 |
| 6,591,306 | B1 | 7/2003 | Redlich ...................... 709/245 |
| 6,643,701 | B1 | 11/2003 | Aziz et al. ................. 709/227 |
| 6,658,568 | B1 | 12/2003 | Ginter et al. ............... 713/193 |
| 2002/0035635 | A1 | 3/2002 | Holden et al. .............. 709/230 |

FOREIGN PATENT DOCUMENTS

| | | |
|---|---|---|
| EP | 0 402 083 A2 | 12/1990 |
| EP | 0 503 765 A2 | 9/1992 |
| EP | 0 586 022 A1 | 9/1994 |
| EP | 0 651 533 A2 | 3/1995 |
| EP | 0 820 176 A2 | 1/1998 |
| EP | 0 989 501 A2 | 3/2000 |
| EP | 0 969 366 A1 | 5/2000 |
| GB | 2 323 757 A | 9/1998 |
| GB | 2 333 878 A | 8/1999 |
| JP | 8110869 | 4/1996 |
| JP | 11031129 A | 2/1999 |
| JP | 11184818 A | 7/1999 |
| WO | 94/03859 | 2/1994 |
| WO | 95/23468 A1 | 8/1995 |
| WO | 96/02993 A2 | 2/1996 |
| WO | 98/38759 A2 | 9/1998 |
| WO | 00/08818 A1 | 2/2000 |

OTHER PUBLICATIONS

Menezes, A., et al. *The Book of Applied Cryptography*, CRC Press, pp. 572-576 (1997).

Bray, Tim, et al., "Extensible Markup Language (XML) 1.0 Specification", Second Edition, W3C, available at http://www.w3.org/TR/REC-xml, Feb. 1998, pp. 1-57.

Dierkes, T., et al., "The TLS Protocol, Version 1.0", IETF RFC2246, Network Working Group, Jan. 1999, pp. 1-67.

Elien, Jean-Emile, "Certificate Discovery using SPKI/SDSI 2.0 Certificates", Masters Thesis MIT LCS, available at http://theory.lcs.mit.edu/~cis/thesis/elien-masters.ps, May 1998, pp. 11-54.

Ellison, C., "SPKI Requirements", IETF RFC 2692, Network Working Group, Sep. 1999, pp. 1-14.

Ellison, C., "Simple Public Key Certificate", IETF draft draft-ietf-spki-cert-structure-05.txt, available at http://www.clark.net/pub/cme/spki.txt, Mar. 13, 1998, pp. 1-35.

Ellison, C., et al., "SPKI Certificate Theory", IETF RFC2693, Network Working Group, Sep. 1999, pp. 1-36.

Ellison, C., et al., "SPKI Examples", <draft-ietf-spki-cert-examples-01.txt>, available at http://www.clark.net/pub/cme/examples.txt, Mar. 10, 1998, pp. 1-13.

Farrell, S., et al., "Limited AttributeCertificate Acquisition Protocol", available at http://search.ietf.org/internet-drafts/draft-ietf-pkix-laap-00.txt, Internet Engineering Task Force, PKIX Working Group, Internet Draft, published Oct. 1999, pp. 1-10.

Harkins, D., et al., "The Internet Key Exchange (IKE)", IETF RFC 2409, Network Working Group, Nov. 1998, pp. 1-34.

Hewlett-Packard Company, "e-Speak Architecture Specification", Version Beta 2.0, available at http://www.e-speak.hp.com/, Sep. 1999, pp. i-xvi, 1-200.

Kent, S., et al., "Security Architecture for the Internet Protocol", IEFT RFC 2401, Network Working Group, Nov. 1998, pp. 1-66.

Merkow, Mark, "More Than A Language—XML Is A Security Tool Too!", Internet.com e-Commerce Guide, available at http://ecommerce.internet.com/outlook/print/0, ,7761_124821, 00.html, May 13, 1999, pp. 1-4.

National Institute of Standards and Technology, *Data Encryption Standard (DES)*, Draft FIPS PUB 46-3, U.S. Department of Commerce, available at http://www.ncsl.nist.gov/fips/, Jan. 20, 1999, pp. 1-20.

National Institute of Standards and Technology, *Des Modes of Operation*, FIPS PUB 81, available at http://www.itl.nist.gov/fipspubs/.], Dec. 2, 1980, pp. 1-22.

National Institute of Standards and Technology, *Secure Hash Standard*, FIPS PUB 180-1, available at http://www.itl.nist.gov/fipspubs/, Apr. 17, 1995, pp. 1-16.

Reagle, Jr., Joseph, editor W3C Working Draft, "XML Signature Requirements", IETF, available at http://www.w3.org/TR/xmldsig-requirements, Oct. 14, 1999, pp. 1-6.

Rivest, R., "S-Expressions draft-rivest-sexp-00.txt", Network Working Group, available at http://theory.lcs.mit.edu/~rivest/sexp.txt, May 4, 1997, pp. 1-11.

* cited by examiner

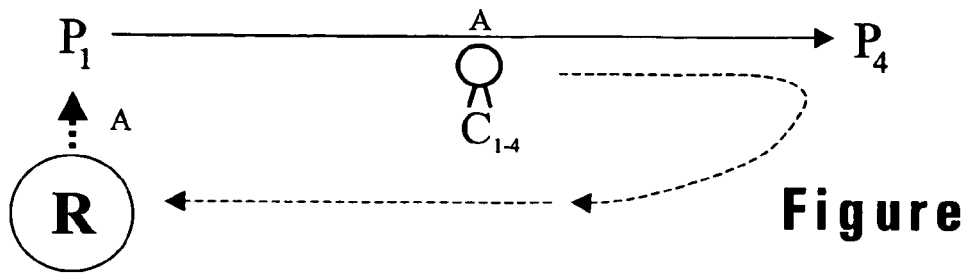
Figure 1
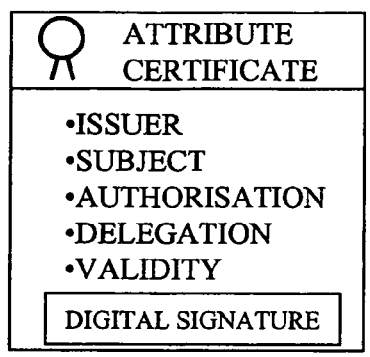
Figure 2
Figure 3
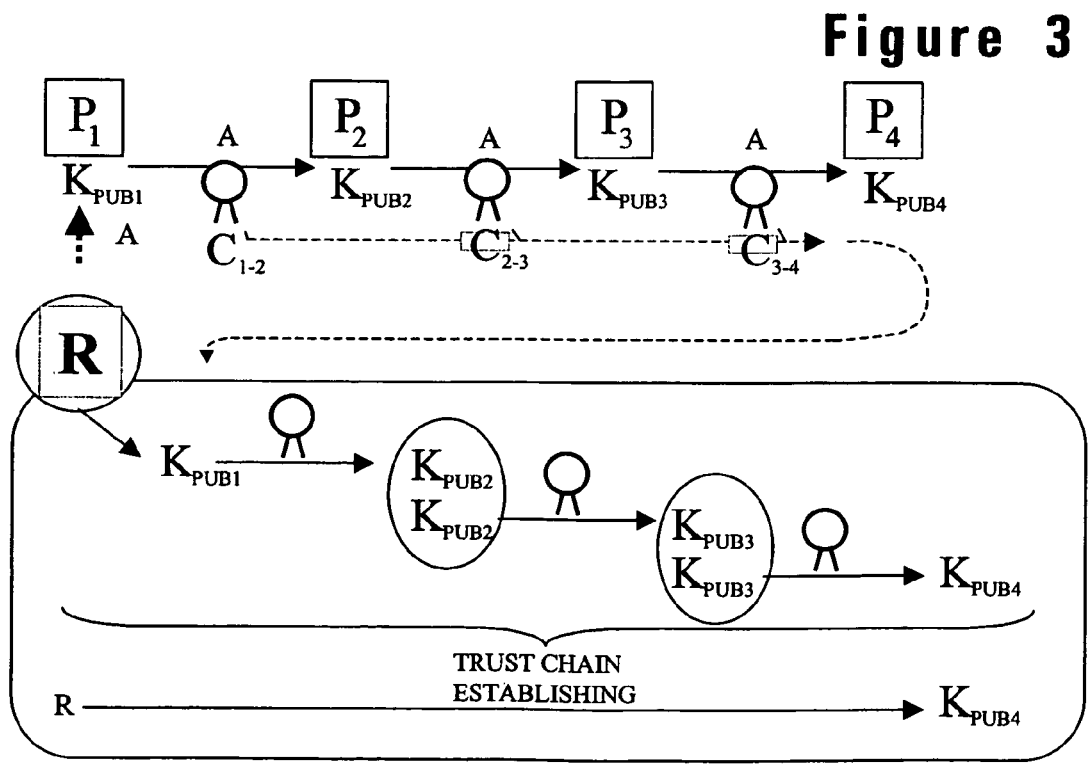

$$K_{PUB\_issuer} \cdot \text{"name"} = K_{PUB\_subject}$$

| RESOURCE REQUIRES: | REQUESTOR IS MEMBER OF ACCREDITED ORGANISATION |
|---|---|
| PREMISES $C_{X-Y}$ $C_{Y-Z}$ | $K_{PUB\_X} \xrightarrow{\text{"Division Y of Company X"}} K_{PUB\_Y}$ $K_{PUB\_Y} \xrightarrow{\text{"Member of Division Y of Company X"}} K_{PUB\_Z}$ |
| RELEVANT AXIOM | $SELF \xrightarrow{\text{Company X}} K_{PUB\_X}$ |
| PRIMARY GOAL | $<SELF \rightarrow K_{PUB\_Z}>$ |
| FIRST DECOMPOSITION | $<SELF \rightarrow K_{PUB\_Y}>$   $<K_{PUB\_Y} \rightarrow K_{PUB\_Z}>$ JUSTIFIED BY $C_{Y-Z}$ |
| SECOND DECOMPOSITIN | $<SELF \rightarrow K_{PUB\_X}>$   $<K_{PUB\_X} \rightarrow K_{PUB\_Y}>$ JUSTIFIED BY AXIOM   JUSTIFIED BY $C_{X-Y}$ |

Figure 7

| | |
|---|---|
| RESOURCE REQUIRES: | REQUESTOR IS MEMBER OF ACCREDITED ORGANISATION |
| PREMISES $C_{X-Y}$ $C_{Y-jd}$ $C_{Name}$ | $K_{PUB\_X} \xrightarrow{\text{"Division Y of Company X"}} K_{PUB\_Y}$ <br> $K_{PUB\_Y} \xrightarrow{\text{"Member of Division Y of Company X"}} \text{"John Doe"}$ <br> $K_{PUB\_Y} \cdot [\text{"John Doe"}] = K_{PUB\_Z}$ |
| RELEVANT AXIOM | $SELF \xrightarrow{\text{Company X}} K_{PUB\_X}$ |
| PRIMARY GOAL | $<SELF \rightarrow K_{PUB\_Z}>$ |
| FIRST DECOMPOSITION | $<SELF \rightarrow \text{"John Doe"}><\text{"John Doe"} \rightarrow K_{PUB\_Z}>$   JUSTIFIED BY $C_{Name}$ |
| SECOND DECOMPOSITION | $<SELF \rightarrow K_{PUB\_Y}> \quad <K_{PUB\_Y} \rightarrow \text{"John Doe"}>$   JUSTIFIED BY $C_{Y-jd}$ |
| THIRD DECOMPOSITION | $<SELF \rightarrow K_{PUB\_X}> \quad <K_{PUB\_X} \rightarrow K_{PUB\_Y}>$ <br> JUSTIFIED BY AXIOM    JUSTIFIED BY $C_{X-Y}$ |

Figure 9

METHOD AND APPARATUS FOR DISCOVERING A TRUST CHAIN IMPARTING A REQUIRED ATTRIBUTE TO A SUBJECT

FIELD OF THE INVENTION

The present invention relates to a method and apparatus for discovering a trust chain that imparts a required attribute to a subject and is grounded in a known trusted issuer.

As used herein, the term "attribute" is used in a broad sense to include any capability, characteristic or authorisation that can be associated with the subject, this usage being maintained even when discussing published documents that would themselves place a more restricted meaning on the term.

Furthermore, as regards to term "delegation" used herein to refer to the bestowing of an attribute by one party (the issuer) on another party (the subject), this term should not be read as implying anything about the issuer's right, or lack of right, to exercise (as opposed to bestow) the attribute being bestowed on the subject, either before or after such bestowal.

BACKGROUND OF THE INVENTION

FIG. 1 depicts a situation where a resource R has authorized party $P_1$ to use the resource—in effect, R has given access authorisation A to $P_1$. $P_1$ can thus contact R and use its capabilities, R allowing access to $P_1$ upon $P_1$ establishing its identity. In addition, R has given $P_1$ the right to pass on ('delegate') the authorisation to others—in FIG. 1, $P_1$ is shown as passing authorization A to party $P_4$. When $P_4$ contacts resource R, the latter will require some proof that $P_4$ has indeed been authorised by $P_1$; this proof takes the form of a certificate $C_{1\text{-}4}$ issued by $P_1$ to $P_4$ and provided by $P_4$ to R. In the electronic world this certificate will generally take the form of a digitally-signed document signed by $P_1$ using public-key/private-key cryptographic technology.

For present purposes, it will be assumed that the certificate $C_{1\text{-}4}$ (and the other certificates referred to below) are SPKI-like certificates, though it should be understood that this is not essential for the present invention. SPKI ("Simple Public Key Infrastructure") certificates are described detail in references [2], [3], [4] listed at the end of this description. FIG. 2 illustrates the main elements of an SPKI-like attribute certificate (as already noted, the term "attribute" is herein used broadly and in relation to SPKI certificates encompasses both "authorization" and "attribute" certificates as defined in the above-referenced documents). The FIG. 2 certificate has fields for specifying the issuer of the certificate (ISSUER), the beneficiary of the certificate (SUBJECT), the attribute being passed to the subject by the certificate (AUTHORIZATION), whether onward delegation of the attribute is permitted (DELGATION), and the limits of validity of the certificate (VALIDITY). An important feature of SPKI-like certificates is that that they are primarily associated with principals that are public keys (or their hashes) rather than with parties identified by distinguished names. Thus, the "issuer" will always be a principal, that is, a public key or its hash; similarly the "subject" can either be a principal or, as will be seen later, a name that can be translated by a name certificate into a principal. Of course, there will be a keyholder who controls the private key associated with the public key forming a principal—however, it is not fundamental that the keyholder is named.

In addition to the above-mentioned fields, certificate $C_{1\text{-}4}$ carries a digital signature formed by using the private key of the issuer.

In relation to the FIG. 1 example, $P_1$ would be keyholder for a first key pair and $P_4$ the keyholder for a second key pair, the "issuer" of the certificate $C_{1\text{-}4}$ then being the public key of the key pair associated with $P_1$ and the "subject" being the public key associated with $P_4$. On receiving the certificate, R checks it by using the digital signature and public key of the issuer. Since R will know the public key of $P_1$ and trust this knowledge (this would be part of the original authorisation of the $P_1$ by R), R can now be sure that the keyholder associated with the public key forming the subject of certificate $C_{1\text{-}4}$ has been duly authorised by $P_1$. R can establish that the party requesting access ($P_4$) is this keyholder by an appropriate challenge-response transaction (in which $P_4$ is required to use its private key to encrypt data sent by R, R then checking the returned encrypted data using the public key for which $P_4$ is supposedly the keyholder).

FIG. 3 illustrates a more complicated situation in which $P_4$ receives authorization A from $P_1$ not directly but through intermediate parties $P_2$ and $P_3$. This time $P_4$ has the following certificates:

$C_{1\text{-}2}$,—the certificate given by $P_1$ to $P_2$ to delegate authorisation A to $P_2$;

$C_{2\text{-}3}$,—the certificate given by $P_2$ to $P_3$ to delegate authorisation A to $P_3$;

$C_{3\text{-}4}$,—the certificate given by $P_3$ to $P_4$ to delegate authorisation A to $P_4$.

Of course, the parties $P_1$, $P_2$, $P_3$ and $P_4$ are not specified in the certificates directly, the latter referring to public keys $K_{PUB1}$, $K_{PUB2}$, $K_{PUB3}$ and $K_{PUB4}$ respectively associated with $P_1$, $P_2$, $P_3$, and $P_4$.

$P_4$ when requesting access to resource R passes the latter all three of the above certificates which R checks; R also checks that the party requesting access ($P_4$) is the key holder of public key $K_{PUB4}$. Thereafter, R has the task of determining whether $K_{PUB4}$ ($P_4$) has indeed been delegated authorisation A. In other words, R needs to be able to establish a trusted chain of delegations of authorisation A from itself to $K_{PUB4}$. The first link in this chain is, of course, the delegation by R to $K_{PUB1}$ and R does not require a certificate to prove this—it is a "trust assumption" of R. R can then see from certificate $C_{1\text{-}2}$ that $K_{PUB1}$ ($P_1$) has authorised a principal constituted by public key $K_{PUB2}$ ($P_2$). From certificate $C_{2\text{-}3}$, R can also see that $K_{PUB2}$ has in turn passed on the authorisation to $K_{PUB3}$ ($P_3$); finally, $C_{3\text{-}4}$ shows that $K_{PUB3}$ has passed on authorisation A to $K_{PUB4}$. By combining the certificates, R can establish the required trust chain from itself to $K_{PUB4}$ ($P_4$).

In carrying out the above proof, R will also have checked that the "delegation" field of each of the certificates $C_{1\text{-}2}$ and $C_{2\text{-}3}$ permitted onward delegation of authorisation A. Additionally, the validity fields of all three certificates will have been checked.

It is possible that one party in the chain only delegated a subset of the authorisation A (for example, only some of the capabilities of R can be used by the subject of the certificate). R therefore needs to ascertain what is the scope of authorisation reaching $K_{PUB4}$ ($P_4$) which is done by determining the intersection of the authorisation fields of all the certificates and seeing if this encompasses the requested access.

As noted above, the "subject" of an SPKI-like certificate can be identified by a name rather than a principal; this name will be a local name referred to the name space in which it is defined (so as to provide a fully qualified SDSI name—see references [3] and [6]). The name space identifier starts with the public key of the "issuer" responsible for the space within which the name exists (followed possibly by one or more sub-name spaces identified by name). Where a local name occurs in the "subject" of a certificate, the name space to which it refers is taken to be that of the "issuer" of the certificate. Naming a principal, if done, is primarily done for human convenience whilst SPKI processing systems fundamentally work with principals. The mapping between a name and the corresponding principal is done using a name certificate. FIG. 3 depicts an SPKI name certificate and, as can be seen, the certificate has four fields that specify the principal who is the issuer of the certificate (ISSUER), the name being assigned in the name space of the issuer (NAME), the subject being named (SUBJECT), and the validity limits of the certificate (VALIDITY). The name certificate also carries a digital signature, formed using the private key associated with the issuer.

In the most straightforward case, the subject will be aprincipal so that the certificate maps a name in the issuer's name space to a corresponding public key (or its hash)—this is the case illustrated in FIG. 3 where the local name "name" that forms the content of the field NAME is depicted as combining with the public key of the issuer $K_{PUB\_issuer}$ issuer to map to the public key $K_{PUB\_subject}$ in the SUBJECT field. The subject may, however, alternatively be a fully qualified SDSI name.

In determining whether a trust chain exists, it may be necessary to use a name certificate to map an authorisation given to a named subject to the corresponding principal.

A more formal consideration of the combining together of contents of certificates is given in section 1 of the Appendix forming the final part of this description. In particular, section 1, Appendix A treats both the delegation rule for combining 5-tuples formed by the contents of attribute certificates, and the naming rule for name mapping using 4-tuples formed by the contents of name certificates. The tuple representations used in the Appendix and at other places in this description are of the form:

5-tuple: <i,s,a,d,v> where i, s, a, d, v respectively correspond to the issuer, subject, authorisation, delegation and validity fields of an attribute certificate, and 4-tuple: <i.n=s,v> where i, n, s, v correspond to issuer, name, subject and validity of a name certificate.

(It will be appreciated that the corresponding graphical representations of certificate contents in the accompanying drawings are less formal, for example the contents of an attribute certificate are generally shown as an arrow from the issuer to the subject, omitting the delegation and validity elements and, where required for clarity, also the authorisation element—which, if present, is placed alongside by the arrow).

Proving a trust chain from the contents of certificates is relatively straight forward if the proving engine is presented with the correct certificates (or, rather, their contents) in the order required. However determining what certificates should be presented may not be a trivial task—it may be necessary to select the required certificates from hundreds of available ones. The task of choosing the certificates, sometimes referred to as "certificate path discovery", is discussed in the MIT Masters thesis of Jean-Emile Elien (reference [7]). However, the thesis concentrates on name rewriting only, and does not explain how SPKI tags (authorisations) containing patterns are dealt with. The treatment of name certificates as a rewriting system by computing the transitive closure has complexity of the order of the cube of the number of certificates which is likely to be impractical.

It is an object of the present invention to provide an improved method and apparatus for seeking a trust chain by which a subject is delegated a particular attribute, starting with a collection of certificates not all of which may be relevant.

SUMMARY OF THE INVENTION

According to one aspect of the present invention, there is provided a method for discovering a trust chain, at least comprising attribute delegations each with an issuer and a subject, that overall imparts a required attribute to a subject and is grounded in a known trusted issuer, the method involving the use of certificates as justification of associated attribute delegations and comprising the steps of:

a)—setting as a primary goal to be proved an attribute delegation from a known trusted issuer to said subject;

b)—seeking a backwards proof of said primary goal by a process of recursively taking a goal to be proved, starting with said primary goal, and decomposing it into subgoals one of which corresponds to an attribute delegation that is justified by an available certificate and has the same subject as the goal being decomposed, inability to decompose a subgoal that has not been proved causing the process to backtrack to a previous subgoal to seek a new decomposition of the latter;

c)—determining that a trust chain has been found upon the process of step (b) producing a chain of subgoals proved by corresponding certificates, that grounds in a subgoal justified by a justified attribute delegation that has as issuer the said known trusted issuer included in said primary goal.

The trusted issuer of the primary goal can be taken as the discovery process itself, the latter having trusted assumptions (axioms) corresponding to delegations from itself to trusted principals. In most situations it will be desirable to permit name mappings justified by certificate, such mappings being permissible links in a trust chain; in such cases, step (b) can involve decomposing a particular subgoal to be proved into a name mapping justified by an available certificate and a new subgoal corresponding to said particular subgoal but with the subject reverse mapped using the name mapping.

BRIEF DESCRIPTION OF THE DRAWINGS

A trust chain discovery engine and method embodying the invention will now be described, by way of non-limiting example, with reference to the accompanying diagrammatic drawings, in which:

FIG. 1 is a diagram depicting a simple authorisation delegation;

FIG. 2 is a diagram of an attribute certificate;

FIG. 3 is a diagram depicting an authorisation delegation chain and the role of certificates in proving the chain;

FIG. 7 is a table illustrating how the FIG. 5 engine proves the first example;

FIG. 9 is a table illustrating how the FIG. 5 engine proves the second example;

BEST MODE OF CARRYING OUT THE INVENTION

Figure 5:
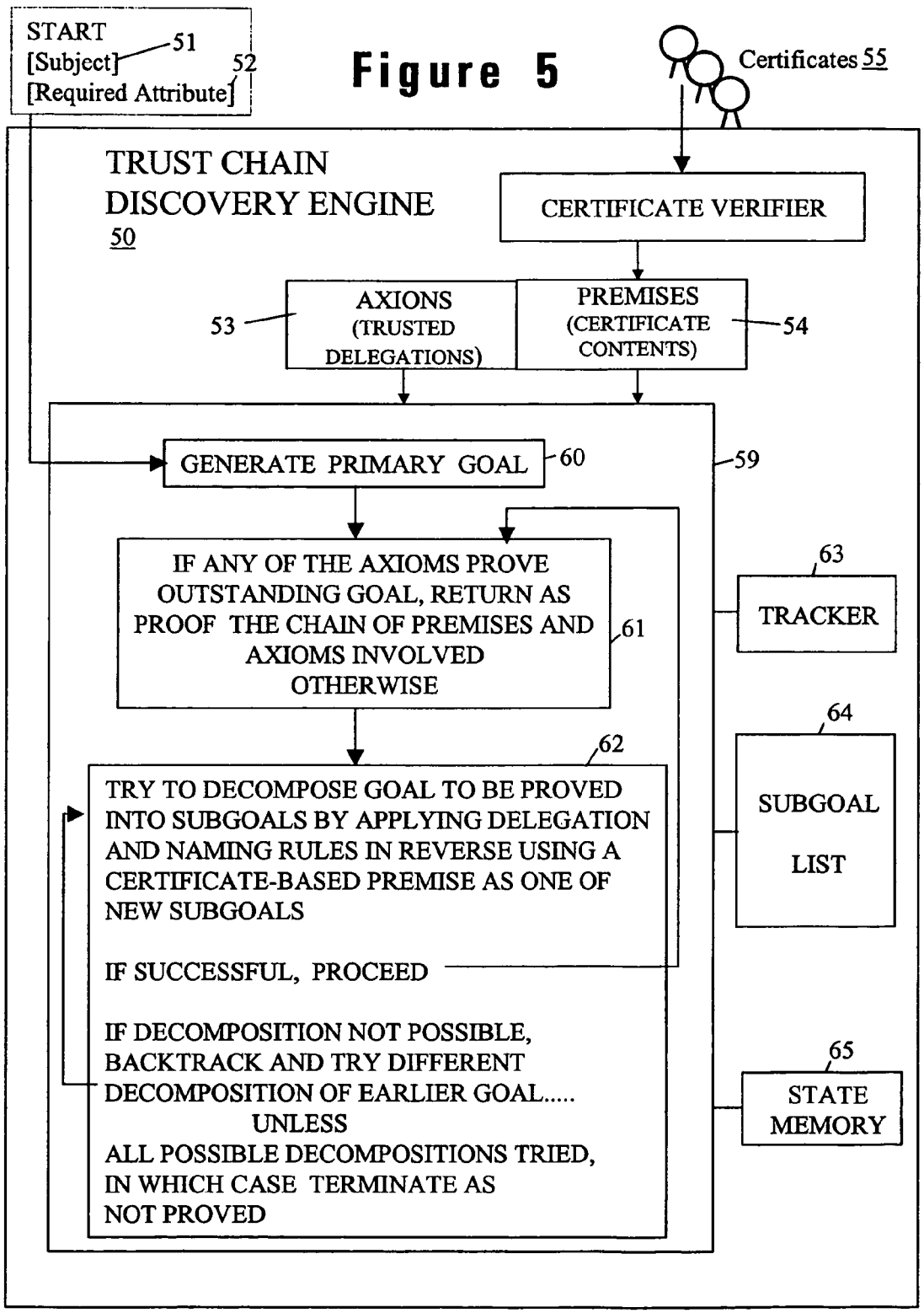
FIG. 5 is a diagram of a trust-chain discovery engine embodying the invention.

The trust-chain discovery engine 50 illustrated in FIG. 5 operates to seek to find a trust chain that starts with a trusted issuer and ends with a specified subject 51, and delegates at least a particular attribute 52 to that subject. In seeking this trust chain, the engine 50 uses axioms (trust assumptions) 53 that specify trusted issuer(s) and/or trusted delegation(s) involving a trusted issuer, and premises 54 formed by the contents (5-tuples and 4-tuples) of attribute and name certificates 55 which have been presented at some stage to the engine 50. These certificates are checked by a certificate verifier 57 using for each certificate the accompanying signature and the public key of the issuer; although FIG. 5 depicts the certificates as being checked when presented, this checking could, in fact, be left until after the certificate has been found to be involved in establishing a trust chain of interest.

The trusted issuer may be a specifically identified principal or, more typically, the discovery method itself (labeled "SELF" below)—this latter possibility is useful as it enables principals that are inherently trusted to be specified in the same format as the certificate-based premises with the issuer being SELF and the subject being the trusted principal (the attribute thus delegated then corresponding to the field over which the principal is trusted). This commonality of format facilitates processing. Where the trusted issuer involved in a delegation expression is SELF, this can conveniently be represented by a null issuer (though for clarity in the following description, the label "SELF" is retained). In the examples given in the following description, the trusted issuer is assumed to be SELF for simplicity.

It will be appreciated that the engine 50 can conveniently be implemented by appropriate programming of a general purpose computer and associated memory for storing, inter alia, the axioms, certificates and premises, and intermediate processing results.

In general the discovery engine operates by starting not with the first link in the trust chain (an axiom/trusted delegation) but with the desired conclusion which it then tries to justify by a backwards proof process applying reverse forms of the delegation and naming rules normally used for tuple reduction. Thus, a main processing functional block 59 of the discovery engine starts with a functional block 60 that forms a primary goal to be proved in the form of a 5-tuple:

<SELF, Subject 51, Required Attribute, *, true> where "*" represents any valid value. In this respect, generally the state of the delegation element does not matter—which is not the case at all for intermediate delegations.

Blocks 61 and 62 represent a recursive process of decomposing a goal to be proved into subgoals which then become the focus of the goal proving process. A goal (subgoal) that does not have SELF as the specified issuer is considered proved if there is a matching premise whilst the subgoal including the issuer SELF is considered proved if there is a matching axiom.

Block 61 checks to see if the outstanding goal to be proved (always arranged to be the goal including SELF as issuer) is proved by any of the axioms 53—if it is, the primary goal has been proved and the chain of this axiom and the premises proving the primary goal is returned. However, if the goal containing is not matched by an axiom, block 62 is entered.

Block 62 seeks to decompose the outstanding goal into subgoals (usually just two). Subgoals are generated by using one of the certificate-derived premises (name or attribute certificate) as one of the premises formed by a reverse application of the delegation or name rule. Thus, if the subject of the goal to be proved is "G" and the attribute concerned is "h", then the premises 54 are searched for a premise with subject also "G" and an attribute at least as embracing as "h". If such a premise is found, then this premise forms one of the new subgoals; the other new subgoal then has as its subject the issuer of the premise just found and used for the first new subgoal whilst the issuer of this second new subgoal is, of course, SELF. The attribute passed by the second subgoal is set to be the same as for the first new subgoal. The first new subgoal is justified immediately since it corresponds to a premise 54 and processing now returns to block 61 to check if the outstanding subgoal (the second newly created one) is proved by an axiom.

It may not be possible to decompose a particular goal to be proved into any of the premises, in which case the current chain being explored is not valid. In this case, processing backtracks towards the primary goal until it reaches a subgoal that can be decomposed by a different one of the premises to that previously used to decompose that subgoal. Assuming that such a re-decomposable subgoal exists, the processing continues in the manner already described. However, it may be that all possible decompositions have been tried without a complete chain back to SELF being discovered; in this case processing terminates with the primary goal unproved.

During processing, a careful track is kept (block 63) of what has been tried and what has not (that is, which premises have been tried against which subgoals) and what premises currently make up the chain being explored. This is to enable the backtracking to proceed in a structured manner and to permit the premises making up a successful chain to be returned.

It is conceivable that the proving process could loop which risks processing going on indefinitely. To avoid this, a subgoal list 64 is maintained of all subgoals created. Each time a new subgoal is generated it is compared with the list 64 and if it is found that the subgoal is already present, processing is terminated.

Certificates (and thus premises 54) may contain validity conditions that are not easily discharged, such as time ranges or online checks. This makes it hard to check these conditions either before or during proof so in the Figure engine validity is only checked once a trust chain has been located, this being done during a forward traversal of the chain. Of course, this means that an otherwise valid trust chain may have to be rejected. In this event, processing must be re-started to find another proof (there may be multiple proofs); to enable processing to continue where it left off, the state of the proving process at the time the first proof was found was stored in state memory 65.

The processing block 59, could alternatively be arranged to find all possible proofs at one go, these proofs being stored and one selected for validity testing, the other proofs not being used unless the first fails the validity check.

Operation of the FIG. 5 engine will now be illustrated by two examples. The first example relates to the situation depicted in FIG. 6. Resource R is set to allow access by Company X including by any employee of Company X provided they can prove this. Resource R trusts a principal $K_{PUB\_X}$ for any matter related to Company X including its internal organisation (Divisions and employees); the principal $K_{PUB\_X}$ is, in fact, associated with a head-office server of Company X. Company X includes a Division Y that has a server which is associated with a principal $K_{PUB\_Y}$. The attribute "Division Y of Company X" is bestowed on the principal $K_{PUB\_Y}$ (the Division Y server) by $K_{PUB\_X}$ (the head-office server) through certificate $C_{X-Y}$. In like manner a principal $K_{PUB\_Z}$ associated with an employee Z of Division Y is bestowed the attribute "Member of Division Y of Company X" by principal $K_{PUB\_Y}$ (Division Y server) through certificate $C_{Y-Z}$.

Consider now what happens when employee Z wants to use resource R and establishes himself with R as the keyholder associated with $K_{PUB-Z}$. Employee Z presents certificates $C_{X-Y}$ and $C_{Y-Z}$ to R and R now uses the trust chain discovery engine 50 to find a trust chain authorizing employee Z to use resource R. FIG. 7 depicts how the engine proceeds based on the target primary goal (issuer: SELF; subject: $K_{PUB\_Z}$), the premises derived from certificates $C_{X-Y}$ and $C_{Y-Z}$, and the axiom that $K_{PUB\_X}$ can be trusted for all things relating to Company. The discovery process proceeds in two decomposition stages. The first decomposition generates a pair of subgoals: <SELF→$K_{PUB\_Y}$> and <$K_{PUB\_Y}$→$K_{PUB\_Z}$> the second of which is justified by the premise based on $C_{Y-Z}$. The second decomposition decomposes <SELF→$K_{PUB\_Y}$> into subgoals: <SELF→$K_{PUB\_X}$> and <$K_{PUB\_X}$→$K_{PUB\_Y}$> the second of which is justified by the premise based on $C_{X-Y}$ whilst the first of which is justified by the axiom which trusts $K_{PUB\_X}$ for all matters concerns Company X.

Figure 6:
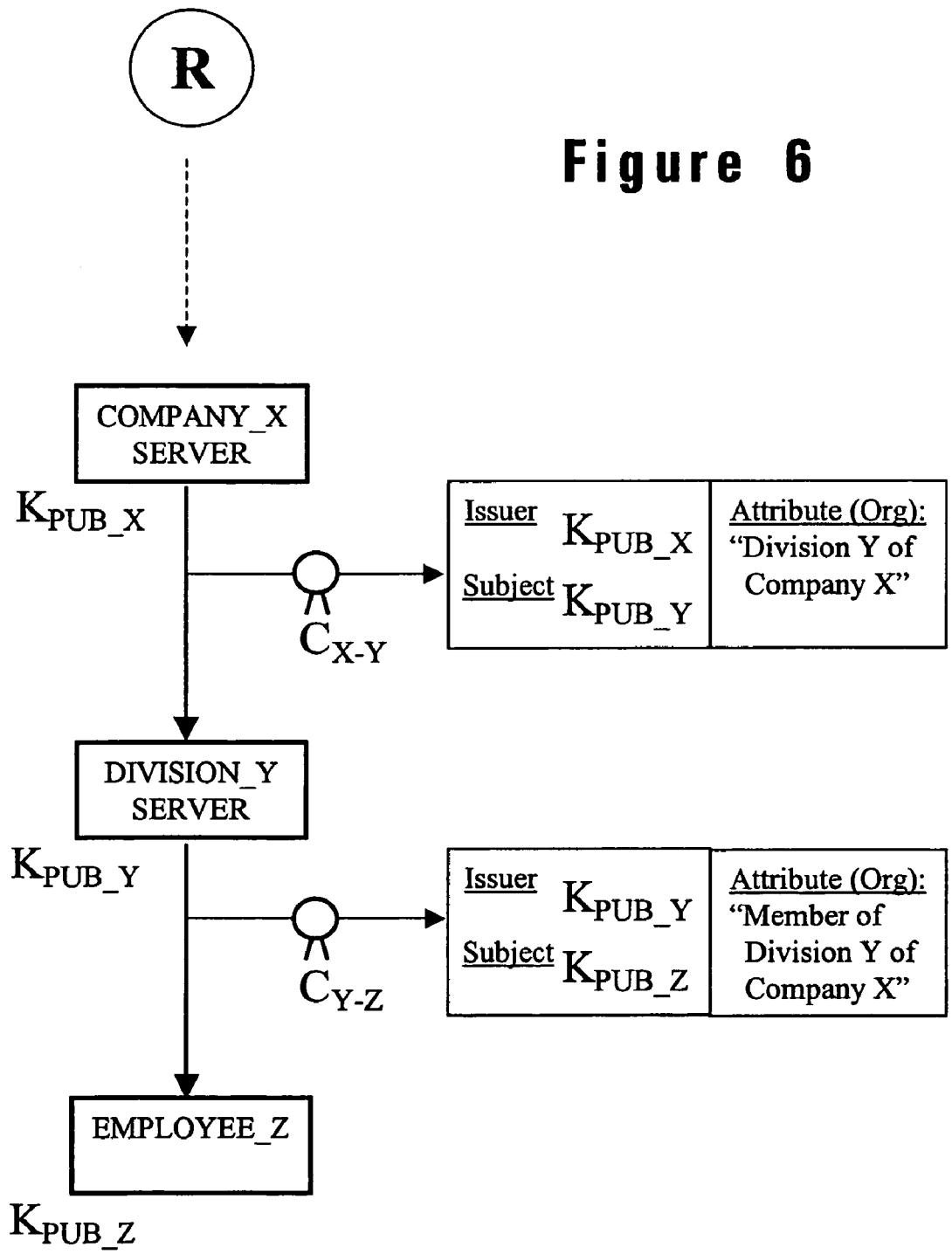
FIG. 6 is a diagram depicting a delegation chain forming the basis of a first example to be proved by the FIG. 5 engine.
Figure 8:
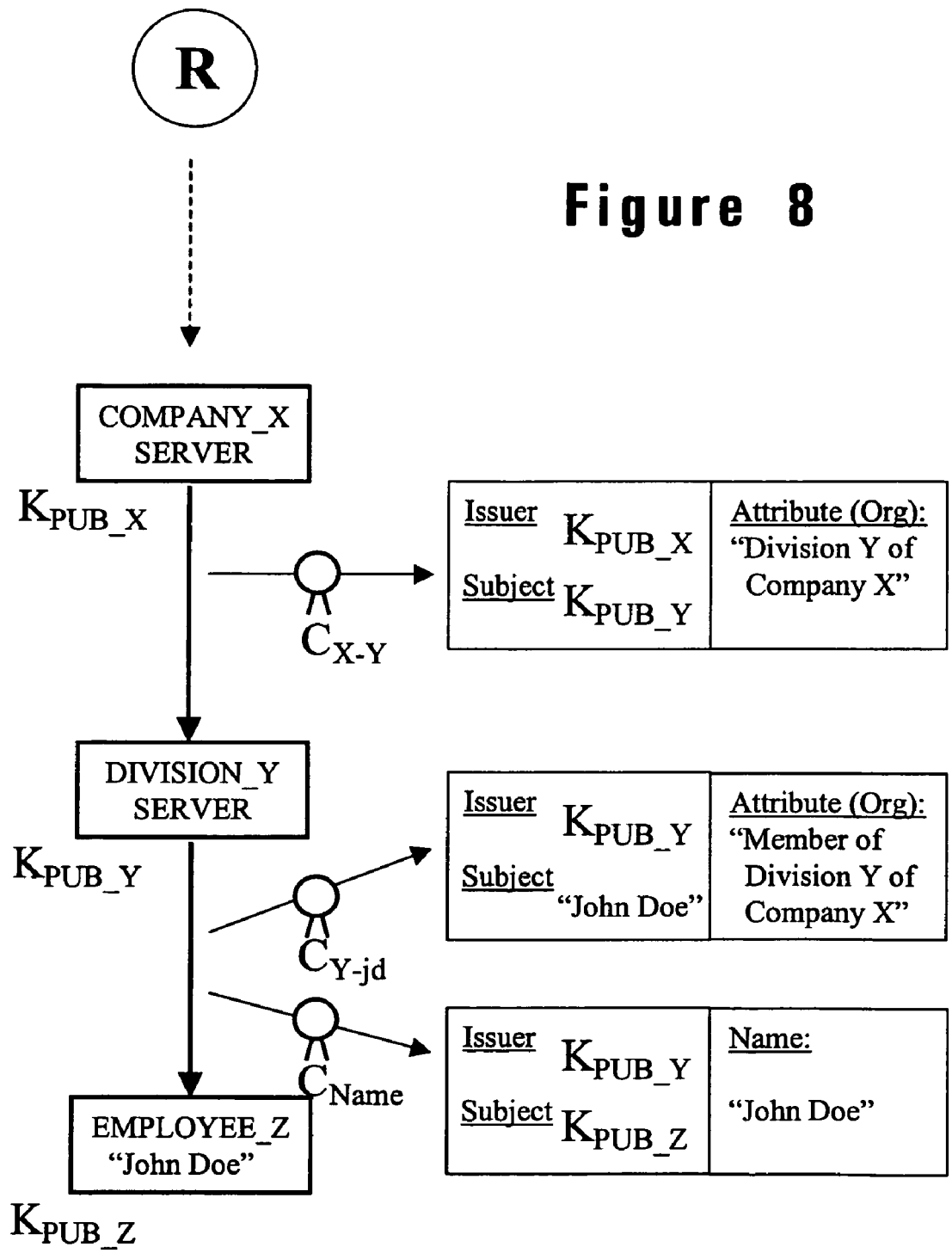
FIG. 8 is a diagram depicting a delegation chain forming the basis of a second example to be proved by the FIG. 5 engine.

The second example is based on the situation depicted in FIG. 8 which is similar to that of FIG. 6 except that now the principal $K_{PUB\_Y}$ (Division Y server) bestows the attribute "Member of Division Y of Company X" on employee Z by using the employee's name "John Doe" as the subject of the certificate concerned ($C_{Y-jd}$) rather than the principal $K_{PUB\_Z}$ associated with employee Z. The name "John Doe" (or, more fully, $K_{PUB\_Y}$. "John Doe") is associated with the principal $K_{PUB\_Z}$ by a name certificate $C_{Name}$. The trust chain discovery process (see FIG. 8) therefore involves a further stage of decomposition in order to translate the subject $K_{PUB\_Z}$ of the primary goal into the name "John Doe" (this extra stage is the first stage carried out).

In the foregoing, the issuer inherently trusted by the discovery engine has been SELF where SELF is used merely as an internal designation. In fact, SELF could be a principal capable of issuing certificates in which case a trust chain can be determined as found, not only in the case where the outstanding subgoal is matched by an axiom, but also where the outstanding subgoal is justified by a certificate-based premise 54. Furthermore, as previously noted, the trusted issuer, rather than being SELF, could have been some specifically identified principal inherently trusted by the discovery engine for matters including the attribute specified in the primary goal; in this case, the trust chain is determined to be complete when the outstanding subgoal including the trusted principal is justified by a certificate (that is, matched by a premise 54). Where there are multiple trusted principals and it is not possible to identify upfront which will ground the trust chain, the issuer of the primary goal can be specified generically (this could be by a null issuer as with the representation of SELF); during the discovery process each new outstanding subgoal is then checked to see if it matches with a premise having as an issuer any of the trusted principals. It will be appreciated that this latter approach is generally less attractive than using SELF as the trusted issuer with axioms corresponding to delegations from SELF to the principals to be trusted, as already described.

Figure 4:
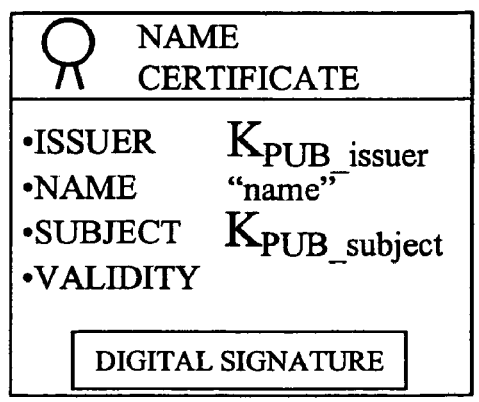
FIG. 4 is a diagram of a name certificate.
Figure 10:
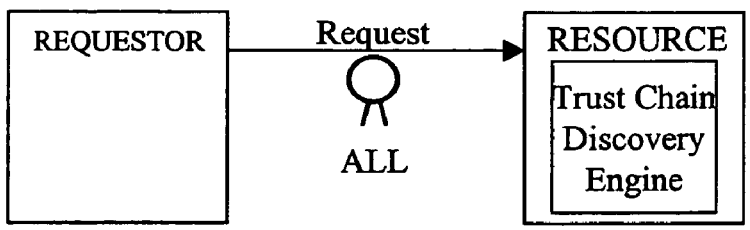
FIG. 10 is a diagram illustrating the incorporation of the FIG. 5 engine in a resource subject of access requests.

In the foregoing examples, the engine 50 has been assumed to be associated with the resource R as depicted in general terms in FIG. 10—in other words, the requester (employee Z in the examples) merely sends to R all the certificates that Z thinks might be useful in establishing the trust chain and it is up to the requestor to prove that such a chain exists. It would alternatively be possible to associate a discovery engine with the requester rather than the resource (see FIG. 11), the requestor first determining a relevant trust chain and then sending only the relevant certificates, in the correct order, to the resource; the resource then has a relatively simple task to reduce the certificates to prove that the requested is entitled to access. Of course, the requestor does not necessarily know the trust assumptions of resource R that can be used to ground a trust chain; accordingly, the requestor must first notify its requirements to the resource which then responds with advice as to what trust assumptions might be of use to the requestor in determining appropriate certificates to send to the resource.

It will be appreciated that the described trust-chain discovery engine is not restricted to use with SPKI-like certificates since the 5- or 4-tuples used by the discovery engine are derivable from other forms of certificates as is explained and illustrated in section 6.5 of RFC2693 (see reference 3)

The present engine uses linear search to find premises generating subgoals. It is possible to index premises by subject to focus the search. This would reduce the amount of work considerably when the premises set become large.

Conditional Certificates

Figure 12:
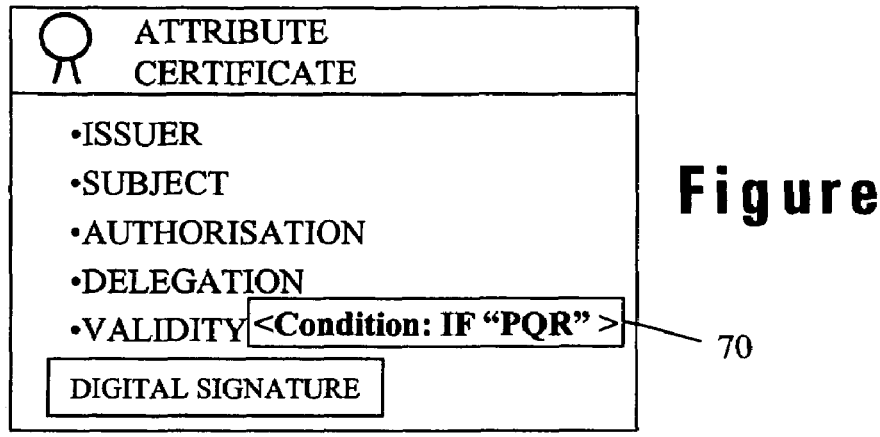
FIG. 12 is a diagram showing the FIG. 2 attribute certificate with a subject-directed condition included in the Validity field of the certificate.

The FIG. 5 trust-chain discovery engine is also capable of handling certificates containing subject-directed conditions such as the attribute certificate shown in FIG. 12. In the FIG. 12 certificate the Validity field includes a subject-directed condition 70 in addition to the normal date/non-revocation/permission validity conditions placed on the certificate itself. The condition 70 could alternatively be included in a different field or its own field. The condition 70 reads (IF "XYZ") which is interpreted to mean that some attribute "PQR" must be true in respect of the subject of the certificate before that subject can be taken as having been delegated the attribute specified in the Delegation field of the certificate. Certificates including such subject-directed conditions are referred to herein as 'conditional certificates'.

More than one subject-directed condition can be included in a conditional certificate, most readily with an (implied or explicit) AND relationship between the conditions. Conditions may, however, also be linked by any other logical operator, though apart from AND, only the OR and NOT operators are likely to be of significant use (with regard to a negated condition, this of course means that the negative has to be positively proved).

Where the FIG. 5 engine finds that the decomposition of a goal involves a premise based on a certificate that contains a subject-directed condition it proceeds by introducing a further subgoal to be proved corresponding to the condition included in the certificate. The further subgoal is of the general form that SELF has delegated the attribute specified in the condition concerned to the subject of the certificate. The inclusion of a further subgoal effectively branches the trust chain, both branches needing to be proved as will now be more fully described hereinafter with reference to FIG. 13.

Where a conditional certificate includes multiple conditions in an AND relationship, then each condition gives rise to a new subgoal. However, if instead the conditions are linked by the OR operator, the engine 50 does not immediately generate a subgoal for each condition but starts by generating a subgoal for a first one of the conditions—only if the engine 50 is unable to generate a trust chain for the branch depending from that subgoal does it consider the next condition by generating a corresponding subgoal which it then seeks to prove.

Figure 13:
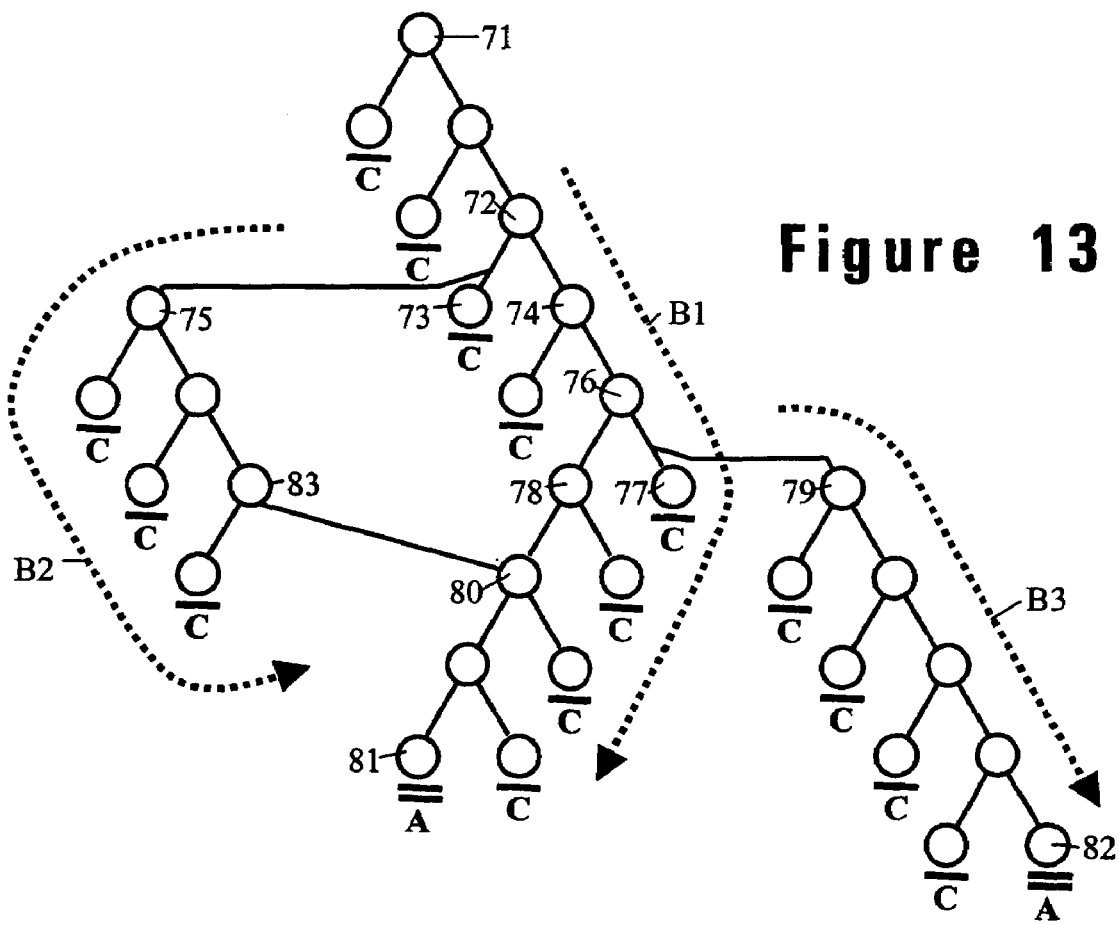
FIG. 13 is a diagram showing the course of processing by the FIG. 5 engine where two of the certificates involved in goal proving are conditional certificates of the FIG. 12 form.

FIG. 13 depicts the course of processing effected by the FIG. 5 engine in proving a primary goal 71, here unspecified. In FIG. 13 goals (including subgoals) to be proved are represented by circles with the decomposition of a goal being depicted by dependent lines connecting to two or more subgoals. The subgoals chosen to fit certificate-based premises and therefore justified by those certificates are shown with a bar and the letter 'C' below; where a subgoal is found as justified by an axiom (thereby grounding the trust chain) the subgoal is shown with a double bar and the letter 'A' below.

In the FIG. 13 example processing, two single-condition conditional certificates are involved in justifying the trust chain giving rise to a main branch B1 for the trust chain and two side branches B2 and B3; branches B1 and B3 ground in respective axioms whereas branch B2 connects back into the main branch B1. More particularly, goal 72 is decomposed into subgoals 73 and 74, subgoal 73 corresponding to a certificate-based premise; the certificate justifying subgoal 73 is a conditional certificate giving rise to a further subgoal 75. At this point the trust chain being built splits into branches B1 and B2, the branch including subgoal 74 being considered the main branch. Similarly, decomposition of subgoal 74 is also based on a premise derived from a conditional certificate and gives rise to subgoals 77-79 where subgoal 79 is the based on the condition included in the certificate justifying the subgoal 77; a further branch B3 is thus formed off the main branch B1.

The engine 50 pursues with proving one branch at a time, the tracker 63 being responsible for tracking what branches are to be proved and where the engine has reached in the proving process. In respect of the FIG. 13 example, the engine 5 first proves branch B1, this branch grounding in a first axiom. The engine then seeks to prove the branch B3 (chosen because it was the last branch created). Branch B3 grounds in a second axiom. Finally, the engine seeks to prove branch B2. This branch is special in that it actually loops back into the main branch B1—this results from decomposition of goal 83 generating a subgoal that is identical to subgoal 80 (or is encompassed by it). Engine 50 is arranged to spot this and to treat its proof of branch B2 as finished (the branch grounding to the first axiom through subgoals already forming part of branch B1 of the trust chain.

Example situations leading to branches in the trust chain are as follows. The primary goal to prove is that a principal (employee Z) is an authorised buyer of department Y of company X. The department Y is a purchasing department but only those of its employees that have particular qualifications are entitled to the designation of authorised buyer. One way of handling this is to bestow the attribute "authorised buyer of department Y" on all employees (that is, their associated principals) using corresponding certificates but to make the certificates conditional on the subject having a specified qualification. The main branch in the trust chain relates to the delegation (with conditions not considered) of the authorised buyer attribute on X, this chain being for present purposes taken be, in the forward direction, SELF→X→Y→Z. The engine 50, when decomposing the primary goal (SELF→Z, authorised buyer attribute), uses the conditional certificate for employee Z and generates in addition to the usual two subgoals, a further subgoal corresponding to (SELF→Z, specified qualification attribute).

The specified qualification could be one issued by a third party N for which company X is not treated by the axioms of engine 50 as being trusted to prove; instead, engine 50 holds an axiom that party N is to be trusted in respect of all qualifications issued by it. In this case, the trust chain branch relating to the qualification can be grounded in the axiom relating to party N. This corresponds to the situation represented by branch B3 in FIG. 13.

Alternatively, the specified qualification could be one issued by the training section TS of department Y of company X; in this case, the qualification branch of the trust chain has a subgoal (SELF→TS) which, assuming that a certificate (Y→TS) has been presented, decomposes into (SELF→Y) and (Y→TS). The latter subgoal is justified by the certicate whilst the former corresponds to a subgoal that is already part of the main branch. This corresponds to the situation represented by branch B2 in FIG. 13.

Conditional certificates can usefully be employed also to place a location condition on the passing of an attribute to a subject. For example, an employee may only be authorised access to a particular resource from a given network subnet—this can be achieved by placing a subnet condition in the certificate giving resource access rights. The trust chain discovery engine seeking to prove access authorisation to the resource then needs to be able to prove that the employee has the specified subnet location.

With regard to the loop check previously described (where engine 50 is arranged to check for duplicate subgoals by comparing each newly generated subgoal with those already in the subgoal list 64, and to terminate processing if the subgoal is already present), this check is refined for handling branches resulting from conditional certificates. More particularly, processing is not terminated if a newly-generated subgoal present in one branch matches with a listed subgoal in another branch—this will generally indicate that the branch being explored has merged back into another branch that has already been proved.

Figure 11:
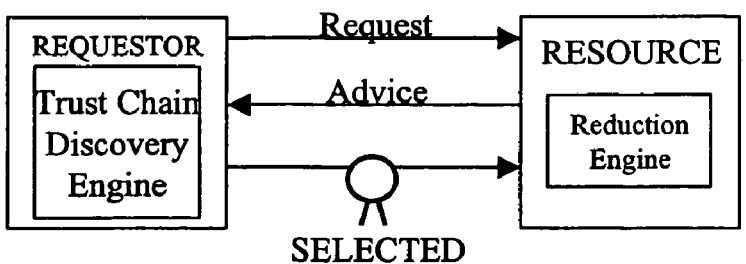
FIG. 11 is a diagram illustrating the incorporation of the Figure engine in a requesting entity.

With respect to the forward traversal of the trust chain carried by engine 50 to check the validity of the chain with respect to the normal validity conditions (date/non-revocation/permission), where the trust chain involves branches, then the forward traversal is done branch by branch, starting with the main branch (the branched structure of the trust chain having been returned by block 61 along with the list of subgoals proving the chain).

Where an entity such as the reduction engine of the Resource shown in FIG. 11, wishes to establish a trust relationship based on a reduction of presented certificates, but does not posses the structure information available to engine 50, the justifying certificates are preferably presented to the entity in forward (or, indeed, reverse) order, starting with the main branch followed by each other branch in turn. The receiving entity can then readily reduce the first set of certificates, using the delegation and naming rules, to establish the trust relationship represented by the main chain, noting on the way any conditional certificates and the required trust relationship they demand. The remaining certificates are then used to establish any such additional trust relationships.

For the above described conditional certificates, the subject of the included condition(s) have been taken to be the subject specified in the certificate, that is, the subject of the conditional was implied as being the subject of the certificate. In fact, it is also possible for the subject of the condition to be explicitly stated and, in this case, the subject could be different to the subject identified in the SUBJECT field of the certificate.

It will be appreciated that appropriate methods and apparatus for generating conditional certificates are well within the competence of persons skilled in the relevant art.

Appendix

This Appendix forms an integral part of the preceding description and of the specification as a whole.

1. Certificate Inference Rules

SPKI certificates and the s-exp syntax are described in references [2, 3, 4, 6]. SPKI defines two inference rules for certificates, a delegation rule and a name-rewriting rule. The delegation rule combines two certificates, one issued by A to B and one issued by B to C to give a third certificate issued by A to C. The name-rewriting rule allows the subject name of a certificate to be rewritten using a name certificate. The SPKI definition is relatively informal, and we formalize it below.

In defining the certificate inference rules we follow the SPKI convention of representing the contents of a certificate by a 5-tuple with the following fields:

issuer i: Public key (or its hash) of the certificate issuer.

subject s: Identifies who or what the capability is issued to. A public key, key hash or object hash (or a name for one).

authorisation a: The attributes (capabilities, authorisations, or other characteristics) transferred from the issuer to the subject by this certificate.

delegation d: Boolean, if this is true the subject is allowed to delegate capabilities.

validity v: A collection of conditions which must all be true for the certificate to be valid.

We use the following notation for a 5-tuple:

<i, s, a, d, v> where i, s, a, d, v are the certificate parameters above.

We use the following notation for a name certificate:

[i.n=s, v]

with fields issuer i: Public key of the certificate issuer.

name n: Name being defined.

subject s: Name or principal the name is defined as.

validity v: Conditions which must be true for the certificate to be valid.

We present goals in the form of sequents:

$\Gamma \vdash A$

Here $\Gamma$ is a list of certificates, the assumptions or premises, while A is the resulting certificate, the conclusion. The symbol $\vdash$ is called turnstile and is pronounced entails. The inference rules are presented as a sequent calculus [5].

This is the certificate delegation rule:

$$\frac{\Gamma \vdash \langle s_0, s_1, a_1, T, v_1 \rangle \quad \Delta \vdash \langle s_1, s_2, a_2, d_2, v_2 \rangle}{\Gamma \cup \Delta \vdash \langle s_0, s_2, a_1 \cap a_2, d_2, v_1 \cap v_2 \rangle}$$

This means that if the sequents above the line can be proved the sequent below the line follows. Here $a_1 \cap a_2$ is authorisation intersection and $v_1 \cap v_2$ is validity intersection.

The rule requires that the subject of the first certificate, $s_1$, is equal to the issuer of the second certificate. It is possible for a subject to be a hash as well as an explicit principal, and we consider a hash equal to a principal if the principal's hash is equal to it.

The name certificate rule is $$\frac{\Gamma \vdash \langle i_0, i.n.y, a, d, v_1 \rangle \quad \Delta \vdash [i.n. = s, v_2]}{\Gamma \cup \Delta \vdash \langle i_0, s.y, a, d, v_1, \cap v_2 \rangle}$$

Here we use i.n for a name starting with i. So the rule says that a name with a prefix matching the definition can be rewritten by replacing the prefix with the value.

$$\text{Assumption rule:} \quad \frac{\Gamma, A \vdash A}{A} \quad A$$

Adding to a set of assumptions proves

Weakening Rule:

$$\frac{\Gamma \vdash \langle s_0, s_1, a_1, d_1, v_1 \rangle}{\Gamma \vdash \langle s_0, s_1, a_2, d_2, v_2 \rangle}$$

as long as $a_2$; $d_2$; $v_2$ are respectively weaker than $a_1$, $d_1$, $v_1$. For tags $a_2$ is weaker than $a_1$ iff (if and only if) $a_2 = a_1 \cap a_2$. For delegation flags $d_2$ is weaker than $d_1$ as long as $d_2$ is not true when $d_1$ is false. For validities $v_2$ is weaker than $v_1$ iff $v_2 = v_1 \cap v_2$.

Tag Matching Rules

The authorisation field (or tag) in a certificate can contain attribute/authorisation patterns as well as explicit authorisation. Also an explicit tag is compatible with any longer tag. Tags have to be intersected as part of the verification process, and we define the tag intersection rules here. Abstractly we consider a tag as defining a set of objects matching it. Tag intersection is then set intersection, where the resulting set must be expressed using tags.

We define tag intersection as follows. Tag intersection is commutative, so a rule for x intersect y also applies to y intersect x. We always use the most specific rule. Any cases not covered are defined not to intersect.

atom x-atom y: intersect if they are equal. The result is x.

list x-list y: intersect if a prefix of one has elements that intersect the corresponding elements of the other. The result is the list of prefix intersections appended to the remainder of the longer list. If there is no intersecting prefix they do not intersect.

star-y: always intersects, with result y.

set x-y: intersect if there is some element of x that y intersects. The result is the set of all intersections of elements of x with y. If the result has one element it is returned instead of a set.

set x-set y: intersect if there is some element of x that intersects some element of y. The result is the set of intersections of elements of x with y. If the result has one element it is returned instead of a set.

range x-atom y: intersect if y lies in the defined range. The result is y.

range x-range y: intersect if they have the same ordering type and a non-empty intersection range exists. The result is the biggest range that is compatible with them both.

prefix x-atom y: intersect if y has the given prefix. The result is y.

prefix x-prefix y: intersect if their prefixes are compatible. The result is a prefix tag with the longer of the two prefixes.

Here, tags are defined not to intersect in some cases where the semantics intersect. Consider range-prefix intersection for example. This is defined to fail, but could be computed. The set tag is essentially a logical or of tag patterns. It might be useful to consider adding a logical and of tag patterns. This would make it simple to define arbitrary tag intersection: in the absence of a specific rule it would be the logical and of the tags.

Tags are equal if they have the same type and equal parameters, except for set tags. A set tag x is a subset of set tag y if every member of x is equal to a member of y. A set tag x is equal to a set tag y if x is a subset of y and y is a subset of x. Equality of set tags is independent of the order of their elements.

Semantically tags are the same if they express the same sets. The tag equality rule attempts to reduce this to syntactic tests on the tags. This means that tag equality fails in some cases where semantics are equal. It may be worth considering working out a complete tag equality rule based on the semantics. If a normal form exists we can reduce tag equality to equality of normal forms. If a normal form does not exist we require a satisfiability checker for the tag logic and this may be provided using a predicate tableau [1].

2. Backwards Proof

Inference rules naturally suggest doing forwards proof, working from hypotheses to conclusions. However, here we do backwards proof by using them in the reverse direction to decompose a goal into subgoals. We use the theorem-proving technique of backwards proof to derive the sequence [5] though we need to modify the rules to make this work. Consider the delegation rule. Working backwards we pick $a_1$ and $a_2$ equal to the tag in the goal, and use the same assumptions. We treat the other fields similarly.

$$\frac{\Gamma \vdash \langle s_0, s_1, a, T, v\rangle \quad \Gamma \vdash \langle s_1, s_2, a, d, v\rangle}{\Gamma \vdash \langle s_0, s_2, a, d, v\rangle}$$

where the rule is now to be interpreted in the reverse direction, telling us how to construct subgoals from the goal.

The name certificate rule is modified similarly:

$$\frac{\Gamma \vdash \langle i_0, i.n.y, a, d, v\rangle \quad \Gamma \vdash [i.n. = s, v]}{\Gamma \vdash \langle i_0, s.y, a, d, v\rangle}$$

We can use a thinning rule to drop assumptions:

$$\frac{\Delta \vdash A}{\Gamma \vdash A} \quad \text{if } \Delta \subset \Gamma$$

This gives us a more general assumption rule:

$$\overline{\Gamma \vdash A} \quad \text{if } A \in \Gamma$$

With regard to constructing a proof, running the delegation rule or name certificate rule backwards would appear to produce two subgoals. However, if we always choose the second subgoal to be one of our assumptions we can discharge it immediately, leaving one subgoal. Given a goal we iterate through the assumptions looking for certificates that allow us to use one of the reverse rules. When we find a suitable name certificate we rewrite the subject using the inverse of the name definition and try that subgoal.

We examine certificates to see if they are suitable as the second premise in the delegation rule. They must have the same subject as the goal and authorize what it does. In practice we combine this with the weakening rule and accept certificates that authorize at least as much as the goal. It is convenient to ignore the goal's validity conditions at this stage as they can be handled later by a forward proof traverse. The first premise of the rule becomes the subgoal. If proof of a subgoal fails we resume the iteration through the assumptions looking for suitable certificates. If this backtracking runs out of alternatives the proof as a whole has failed. If the proof succeeds we return the last subgoal and the list of certificates that lead us to it. We then traverse this list constructing the forwards proof to get the final conclusion. We check that the authorisation of the original goal is weaker than the authorisation of the conclusion of the proof, but we allow the validity to be different. This is because we only know we want the validity to evaluate to true, but we do not know what validity conditions certificates will impose, and we may not be able to check them during proof (since they may include online checks). The validity must be checked before the authorisation is enacted.

Termination and Completeness

It is possible to construct sets of name certificates such that forwards rewriting does not terminate. A simple example is [i.a=i.a.a]. However, backwards proof terminates even in the presence of this definition since it can never make a name longer. It is still possible for backwards proof to loop however. This happens if a sequence of rewrites creates the same subgoal again. The name certificates [i.a=i.b] and [i.b=i.a] form such a cycle (which also loops forwards). Looping can also occur because of delegation cycles.

We prevent looping by keeping a stack of subgoals and checking whether a subgoal already exists before adding it. This also causes termination, since in order for the trust-chain discovery engine to fail to terminate it has to generate an infinite sequence of different subgoals. This is because an infinite tree with finite branching must contain an infinite branch. However our certificate sets are finite so there is no infinite derivation using them (as long as we work backwards).

It can also be shown that the backwards algorithm finds a derivation if one exists. Suppose a derivation exists. It must start with a trust assumption, use name certificates or delegation certificates and end with the desired goal. At each point in this derivation we have a goal with a certificate justifying its derivation from another certificate. The algorithm considers all possible candidates for such steps, so it must find them if they exist. The algorithm backtracks over all possible steps, so it must find the derivation if it exists. Combining this with the termination property above we see that the algorithm is complete (finds a derivation if one exists) and terminates. This means it is a decision procedure for goals.

Trust Assumptions

So far the trust assumptions have not been mentioned. We represent a trust assumption as a 5-tuple with a null issuer. Since null issuers are illegal in certificates they can arise in no other way. When a trust-chain discovery engine creates the initial goal it sets the issuer to null. This means that only proofs starting from the trust assumptions will be accepted. The proof process does not need to treat trust assumptions specially.

3. Extension

Sequent calculi normally contain logical rules in addition to the structural rules we have defined. These can be used to represent intermediate deductions, such as the cut rule $$\frac{\Gamma \vdash A \quad \Delta, A \vdash B}{\Gamma, \Delta \vdash B}$$

This allows a proof to be structured into lemmas, and provides a formal basis for storing previously proved theorems and using them in proofs.

At present the described trust-chain discovery engine only supports proving a single tag, with a set of tags treated as having to prove them all. This is a restricted form of logical and. It is possible to extend the calculus by explicitly introducing logical connectives, such as and and or, together with their inference rules. This would allow us to treat proofs of (*set) patterns more flexibly than at present.

References

[1] J. L. Bell, M. Machover, "A course in mathematical logic", Noth-Holland Publishing Company, 1977.
[2] C. Ellison et al., "Simple Public Key Certificate", IETF draft draft-ietf-spki-cert-structure-05.txt, March 1998. Available at http://www.clark.net/pub/cme/spki.txt.
[3] C. Ellison et al., "SPKI Certificate Theory", IETF RFC2693 September 1999.
[4] C. Ellison et al., "SPKI Examples", IETF RFC 2692 September 1999
[5] L. C. Paulson, Logic and computation: interactive proof with Cambridge LCF, Cambridge tracts in theoretical computer science, Cambridge University Press, 1987.
[6] R. Rivest, "S-Expressions", IETF draft draft-rivest-sexp-00.txt, May 1997. Available at http://theory.lcs.mit.edu/¢rivest/sexp.txt.
[7] Jean-Emile Elien, "Certificate Discovery Using SPKI/SDSI 2.0 Certificates", Masters Thesis, MIT LCS, May 1998. Available at <http://theory.lcs.mit.edu/~cis/theses/elien-masters.ps>

The invention claimed is:

1. A method for discovering a trust chain, wherein the trust chain comprises at least attribute delegations each with an issuer and a subject, overall imparts a required attribute to a subject, and is grounded in a known trusted issuer, and wherein certificates are used as justification of associated attribute delegations, the method comprising:
   a) setting as a primary goal to be proved an attribute delegation from a known trusted issuer to said subject;
   b) seeking a backwards proof of said primary goal by a process of recursively taking a goal to be proved, starting with said primary goal, and decomposing it into subgoals one of which corresponds to an attribute delegation that is justified by an available certificate and has the same subject as the goal being decomposed, inability to decompose a subgoal that has not been proved causing the process to backtrack to a previous subgoal to seek a new decomposition of the latter; and
   c) determining that a trust chain has been found upon the process of (b) producing a chain of subgoals that is proved by corresponding certificates and that grounds in a subgoal justified by a justified attribute delegation that has as issuer the said known trusted issuer included in said primary goal.

2. A method according to claim 1, wherein the known trusted issuer included in said primary goal is a specifically identified entity that is inherently trusted by the discovery method at least in relation to said required attribute, said justified attribute delegation being an attribute delegation that is justified by a corresponding certificate.

3. A method according to claim 1, wherein the known trusted issuer included in said primary goal is the discovery method itself; said justified attribute delegation being an attribute delegation that is justified either by an axiom inherently trusted by the discovery method, or by a corresponding certificate.

4. A method according to claim 3, wherein the discovery method, as said known trusted issuer, is represented in said primary goal and said axiom as a null issuer.

5. A method according to claim 1, wherein name mappings justified by corresponding certificates are permitted in a said trust chain in addition to attribute delegations, and wherein the process of (b) further comprises:
   decomposing, as appropriate, a particular subgoal to be proved into a name mapping justified by an available certificate and a new subgoal corresponding to said particular subgoal but with the subject reverse mapped using said name mapping.

6. A method according to claim 1 wherein seeking a backwards proof further comprises:
   maintaining a list of subgoals already generated and pursued, checking each new subgoal against said list, and terminating the process of seeking of a backwards proof in failure in the event of a new subgoal being found to already exist in the list.

7. A method according to any one of claims 1-5, wherein at least some of said certificates used in proving a determined trust chain as found have associated validity data, the method comprising the further step of traversing the trust chain in a forwards direction from the trusted attribute delegation that grounds it and combining the validity data of all certificates involved to determine the validity of the overall attribute delegation represented by the chain.

8. A method according to claim 7, wherein determining that a trust chain has been found comprises storing the state of the seeking of a backwards proof prior to checking the validity of the trust chain found, this state being used to continue the process should the check of the validity of the initially found chain show that the chain is not valid.

9. A method according to any one of claims 1-5, wherein an attribute-delegation certificate used to prove a said subgoal has a subject-directed condition associated with it requiring that a specified subject must have a particular attribute in order for the delegation to be valid, and wherein the process of (b) further comprises:

making said subject-directed condition a further subgoal to be proved for the current chain being followed.

10. A method according to any one of claims 1-5, wherein the process of (b) is run to completion to find all trust chains, if any, proving the primary goal.

11. A method of selecting certificates to be sent to a resource which requires proof that a subject has a particular attribute before allowing use of the resource, comprising:

finding a trust chain by the method of any one of claims 1 to 5 in respect of said subject and an issuer known, or likely, to be trusted by said resource; and selecting for sending to said resource certificates associated with a trust chain, if any, thereby found.

12. A method of determining whether a resource requiring a user to have at least one predetermined attribute, is usable by a subject presenting certificates to the resource, comprising:

finding a trust chain by the method of any one of claims 1 to 5 in respect of said subject and an issuer known and trusted by said resource; and determining that use of the resource by the subject is permitted if a trust chain can be found.

13. A system for discovering a trust chain, wherein the trust chain comprises at least attribute delegations each with an issuer and a subject, overall imparts a required attribute to a subject, and is grounded in a known trusted issuer, and wherein certificates are used as justification of associated attribute delegations, the system comprising a processor for:

setting as a primary goal to be proved an attribute delegation from a known trusted issuer to said subject;

seeking a backwards proof of said primary goal by a process of recursively taking a goal to be proved, starting with said primary goal, and decomposing it into subgoals one of which corresponds to an attribute delegation that is justified by an available certificate and has the same subject as the goal being decomposed, inability to decompose a subgoal that has not been proved causing the process to backtrack to a previous subgoal to seek a new decomposition of the latter; and determining that a trust chain has been found upon producing a chain of subgoals that is proved by corresponding certificates and that grounds in a subgoal justified by a justified attribute delegation that has as issuer the said known trusted issuer included in said primary goal.

14. A system according to claim 13, wherein the known trusted issuer included in said primary goal is a specifically identified entity that is inherently trusted at least in relation to said required attribute, said justified attribute delegation being an attribute delegation that is justified by a corresponding certificate.

15. A system according to claim 13, wherein the known trusted issuer included in said primary goal is a discovery method of the system itself; said justified attribute delegation being an attribute delegation that is justified either by an axiom inherently trusted by the discovery method, or by a corresponding certificate.

16. A system according to claim 15, wherein the discovery method, as said known trusted issuer, is represented in said primary goal and said axiom as a null issuer.

17. A system according to claim 13, wherein name mappings justified by corresponding certificates are permitted in a said trust chain in addition to attribute delegations, and wherein seeking a backwards proof further comprises:

decomposing, as appropriate, a particular subgoal to be proved into a name mapping justified by an available certificate and a new subgoal corresponding to said particular subgoal but with the subject reverse mapped using said name mapping.

18. A system according to any one of claims 13-17, wherein seeking a backwards proof further comprises:

maintaining a list of subgoals already generated and pursued, checking each new subgoal against said list, and terminating the process of seeking a backwards proof in failure in the event of a new subgoal being found to already exist in the list.

19. A system according to any one of claims 13-17, wherein at least some of said certificates used in proving a determined trust chain as found have associated validity data, the processor further for traversing the trust chain in a forwards direction from the trusted attribute delegation that grounds it and combining the validity data of all certificates involved to determine the validity of the overall attribute delegation represented by the chain.

20. A system according to claim 19, wherein determining that a trust chain has been found comprises storing the state of the seeking of a backwards proof prior to checking the validity of the trust chain found, this state being used to continue the process should the check of the validity of the initially found chain show that the chain is not valid.

21. A system according to any one of claims 13-17, wherein an attribute-delegation certificate used to prove a said subgoal has a subject-directed condition associated with it requiring that a specified subject must have a particular attribute in order for the delegation to be valid, and wherein seeking a backwards proof further comprises:

making said subject-directed condition a further subgoal to be proved for the current chain being followed.

22. A system according to claim 13, wherein the seeking of a backwards proof is run to completion to find all trust chains, if any, proving the primary goal.

23. A system according to any one of claims 13-17, wherein said processor is further for selecting certificates to be sent to a resource which requires proof that a subject has a particular attribute before allowing use of the resource by:

finding a trust chain in respect of said subject and an issuer known, or likely, to be trusted by said resource; and selecting for sending to said resource certificates associated with a trust chain, if any, thereby found.

24. A system according to any one of claims 13-17, wherein said processor is further for determining whether a resource requiring a user to have at least one predetermined attribute is usable by a subject presenting certificates to the resource, by:

finding a trust chain in respect of said subject and an issuer known and trusted by said resource; and determining that use of the resource by the subject is permitted if a trust chain can be found.

25. A computer program product for use in connection with a computer for discovering a trust chain, wherein the trust chain comprises at least attribute delegations each with an issuer and a subject, overall imparts a required attribute to a subject, and is grounded in a known trusted issuer, and wherein certificates are used as justification of associated attribute delegations, said computer program product comprising a computer-readable medium having encoded thereon instructions for:

setting as a primary goal to be proved an attribute delegation from a known trusted issuer to said subject;

seeking a backwards proof of said primary goal by a process of recursively taking a goal to be proved, starting with said primary goal, and decomposing it into subgoals one of which corresponds to an attribute delegation that is justified by an available certificate and has the same subject as the goal being decomposed, inability to decompose a subgoal that has not been proved causing the process to backtrack to a previous subgoal to seek a new decomposition of the latter; and determining that a trust chain has been found upon producing a chain of subgoals that is proved by corresponding certificates and that grounds in a subgoal justified by a justified attribute delegation that has as issuer the said known trusted issuer included in said primary goal.

26. A computer program product according to claim 25, wherein the known trusted issuer included in said primary goal is a specifically identified entity that is inherently trusted at least in relation to said required attribute, said justified attribute delegation being an attribute delegation that is justified by a corresponding certificate.

27. A computer program product according to claim 25, wherein the known trusted issuer included in said primary goal is a discovery method itself; said justified attribute delegation being an attribute delegation that is justified either by an axiom inherently trusted by the discovery method, or by a corresponding certificate.

28. A computer program product according to claim 27, wherein the discovery method, as said known trusted issuer, is represented in said primary goal and said axiom as a null issuer.

29. A computer program product according to claim 25, wherein name mappings justified by corresponding certificates are permitted in a said trust chain in addition to attribute delegations, and wherein seeking a backwards proof further comprises:

decomposing, as appropriate, a particular subgoal to be proved into a name mapping justified by an available certificate and a new subgoal corresponding to said particular subgoal but with the subject reverse mapped using said name mapping.

30. A computer program product according to any one of claims 25-29, wherein seeking a backwards proof further comprises:

maintaining a list of subgoals already generated and pursued, checking each new subgoal against said list, and terminating the process of seeking a backwards proof in failure in the event of a new subgoal being found to already exist in the list.

31. A computer program product according to any one of claims 25-29, wherein at least some of said certificates used in proving a determined trust chain as found have associated validity data, the method further comprising traversing the trust chain in a forwards direction from the trusted attribute delegation that grounds it and combining the validity data of all certificates involved to determine the validity of the overall attribute delegation represented by the chain.

32. A computer program product according to claim 31, wherein determining that a trust chain has been found comprises storing the state of the seeking of a backwards proof prior to checking the validity of the trust chain found, this state being used to continue the process should the check of the validity of the initially found chain show that the chain is not valid.

33. A computer program product according to any one of claims 25-29, wherein an attribute-delegation certificate used to prove a said subgoal has a subject-directed condition associated with it requiring that a specified subject must have a particular attribute in order for the delegation to be valid, and wherein seeking a backwards proof further comprises:

making said subject-directed condition a further subgoal to be proved for the current chain being followed.

34. A computer program product according to claim 25, wherein the seeking of a backwards proof is run to completion to find all trust chains, if any, proving the primary goal.

35. A computer program product according to any one of claims 25-29 and further for selecting certificates to be sent to a resource which requires proof that a subject has a particular attribute before allowing use of the resource, by:

finding a trust chain in respect of said subject and an issuer known, or likely, to be trusted by said resource; and selecting for sending to said resource certificates associated with a trust chain, if any, thereby found.

36. A computer program product according to any one of claims 25-29 and further for determining whether a resource requiring a user to have at least one predetermined attribute is usable by a subject presenting certificates to the resource, by:

finding a trust chain in respect of said subject and an issuer known and trusted by said resource; and determining that use of the resource by the subject is permitted if a trust chain can be found.

* * * * *